(12) United States Patent
O'Brien

(10) Patent No.: US 12,068,940 B2
(45) Date of Patent: Aug. 20, 2024

(54) RECOMMENDATION AND IMPLEMENTATION SYSTEMS AND METHODS FOR EDGE COMPUTING

(71) Applicant: CenturyLink Intellectual Property LLC, Broomfield, CO (US)

(72) Inventor: William O'Brien, Aurora, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/550,583

(22) Filed: Dec. 14, 2021

(65) Prior Publication Data

US 2022/0210045 A1 Jun. 30, 2022

Related U.S. Application Data

(60) Provisional application No. 63/132,193, filed on Dec. 30, 2020.

(51) Int. Cl.
*H04L 43/50* (2022.01)
*H04L 41/5067* (2022.01)
*H04L 43/0811* (2022.01)
*H04L 43/0864* (2022.01)
*H04L 43/0894* (2022.01)

(52) U.S. Cl.
CPC .......... *H04L 43/50* (2013.01); *H04L 41/5067* (2013.01); *H04L 43/0811* (2013.01); *H04L 43/0864* (2013.01); *H04L 43/0894* (2013.01)

(58) Field of Classification Search
CPC . H04L 43/50; H04L 41/5067; H04L 43/0811; H04L 43/0864; H04L 43/0894; H04L 67/101; H04L 67/1021; H04L 67/51; H04L 67/52; H04L 67/1014
See application file for complete search history.

(56) References Cited

U.S. PATENT DOCUMENTS

| | | | |
|---|---|---|---|
| 9,998,862 B1* | 6/2018 | Rice ...................... | H04W 4/021 |
| 10,979,534 B1* | 4/2021 | Parulkar ................. | H04L 67/52 |
| 2003/0101278 A1* | 5/2003 | Garcia-Luna-Aceves ................... | G06F 16/9574 |
| | | | 709/240 |
| 2007/0226294 A1* | 9/2007 | Pruitt ...................... | H04L 67/51 |
| | | | 709/203 |
| 2011/0267952 A1* | 11/2011 | Ko ....................... | H04L 43/0864 |
| | | | 370/237 |

(Continued)

OTHER PUBLICATIONS

International Search Report and Written Opinion of the International Searching Authority, dated Mar. 24, 2022, Int'l Appl. No. PCT/US21/063316, Int'l Filing Date Dec. 14, 2021; 13 pgs.

(Continued)

*Primary Examiner* — Philip J Chea
*Assistant Examiner* — James Ross Hollister

(57) ABSTRACT

In examples, systems and methods are described for edge computing recommendations and implementation. A service request is received from a client computing device that includes information about a location of a customer site and latency requirements of the customer, among other information. The system provides recommendations for particular provider computing site(s) based on, e.g., rough and/or fine latency estimates, and implements the requested computing services at selected provider computing site(s).

18 Claims, 4 Drawing Sheets

(56) References Cited

U.S. PATENT DOCUMENTS

2020/0329109 A1\* 10/2020 Ppallan ............... H04L 61/4511
2022/0061059 A1\* 2/2022 Dunsmore ............ H04L 9/0897
2022/0103617 A1\* 3/2022 Campbell ............. H04L 67/101

OTHER PUBLICATIONS

International Preliminary Report on Patentability, dated Jul. 13, 2023, Int'l Appl. No. PCT/US2021/063316, Int'l File Date Dec. 14, 2021; 11 pgs.

\* cited by examiner

RECOMMENDATION AND IMPLEMENTATION SYSTEMS AND METHODS FOR EDGE COMPUTING

CROSS-REFERENCE TO RELATED APPLICATIONS

This application claims benefit of U.S. Provisional Application No. 63/132,193 filed 30 Dec. 2020, and which application is incorporated herein by reference. To the extent appropriate, a claim of priority is made to the above disclosed application.

BACKGROUND

Edge computing is a computing model in which computations and/or data storage is performed near a location of an entity that requested computing services. The close proximity of the requesting computing device to the provider computing device(s) that perform the computations and/or data storage saves bandwidth and reduces latency. It is with respect to this general environment that aspects of the present application are directed.

SUMMARY

Aspects of the present application include a method for recommending and implementing edge computing services. For example, the method comprises receiving customer information in a service request, wherein the customer information includes at least a desired computing service and customer location data for a customer site. The method continues by determining provider location data for a plurality of provider computing sites, and determining a rough estimate of latency for each of the plurality of provider computing sites based on the customer location data and the provider location data. The method further includes providing a list of the provider computing sites based on the rough estimate of latency for each of the provider computing sites, receiving a selection of one of the provider computing sites, and providing the computing service to the customer site from the selected provider computing site.

Aspects of the present application further include a system for recommending and implementing edge computing services. The system may comprise at least one processor, memory that is operatively connected to the at least one processor and stores instructions that, when executed by the at least one processor, cause the system to perform a method. For example, the method may comprise receiving customer information in a service request, wherein the customer information includes at least a desired computing service and customer location data for a customer site. The method continues by determining provider location data for a plurality of provider computing sites, and determining a rough estimate of latency for each of the plurality of provider computing sites based on the customer location data and the provider location data. The method further includes providing a list of the provider computing sites based on the rough estimate of latency for each of the provider computing sites, receiving a selection of one of the provider computing sites, and providing the computing service to the customer site from the selected provider computing site.

Further aspects of the present application include another method for recommending and implementing edge computing services. The method may comprise receiving customer information in a service request, wherein the customer information includes at least a latency requirement, a desired computing service, and customer location data for a customer site. The method may continue by determining, based on the latency requirement, a service radius, determining provider location data for a plurality of provider computing sites, and determining whether each of the plurality of provider computing sites is within the service radius of the customer site based on the customer location data and the provider location data. Further, the method may include providing a list of the provider computing sites that are within the service radius of the customer site, receiving a selection of one of the provider computing sites from the list, and providing the computing service to the customer site from the selected provider computing site.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

The present application describes an edge computing recommendation and implementation system that enables an individual user and/or an entity to specify latency and/or computing service requirements, receive a recommendation for one or more service provider computing site(s), automatically procure resources necessary to provide the desired computing services, and provide the requested computing service(s) at a selected provider computing site.

Figure 1:
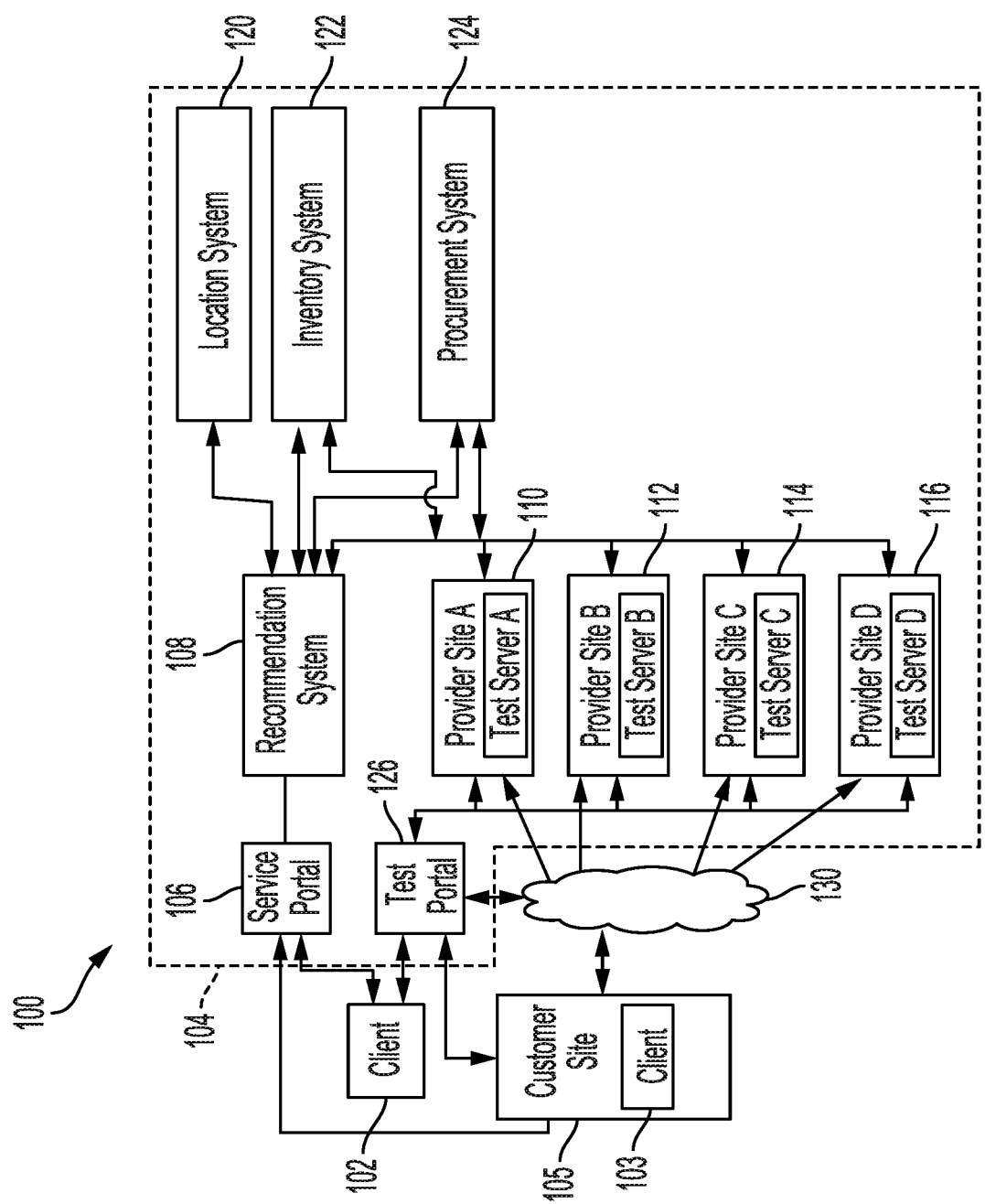
FIG. 1 depicts a system for recommendation and implementation of edge computing according to presently described examples.

FIG. 1 shows an example system 100 for providing and implementing edge computing recommendations to provide one or more computing service(s). In examples, a client device 102 may access a provider system 104 through a service portal 106. In some examples, client device 102 may not be associated with a particular customer site. For example, client device 102 may be a laptop, a phone, or other wireless or wired computing device accessing the service portal 106 through one or more private or public networks. In other examples, client device 102 may be a device associated with provider system 104 that can be used (e.g., by representatives of the provider) in demonstrating available provider solutions for a particular customer. In other examples, a client device 103 that is part of a customer site 105 may be used to access service portal 106.

In examples, the service portal 106 may comprise one or more computing systems, programs, applications, or combination(s) thereof to implement an interface for recommendation system 108. Service portal 106 may, for example, interface with one or more other systems of provider system 104 to authenticate and authorize a particular client device 102, 103 in using the recommendation system 108. Service portal 106 may also interface with other portions of provider system 104 to allow a customer of provider system 104 to view, maintain, update, or otherwise utilize information relating to the customer's use of computing services offered by the provider system 104. In some examples, service portal 106 and recommendation system 108 may be combined into a single device and/or system.

In examples, the provider system 104 may comprise multiple provider computing sites 110, 112, 114, 116 each of which may comprise an edge computing site. In examples, provider computing sites 110, 112, 114, 116 may be geographically dispersed to allow provider system 104 to efficiently provide edge computing services to customer sites, such as customer site 105. Although only four provider computing sites 110, 112, 114, 116 are depicted, any number of provider computing sites may be provided. In examples, a customer site 105 benefits from obtaining computing services from a provider computing site 110, 112, 114, or 116 nearby the customer site 105 (to reduce latency). Further, provider computing sites 110, 112, 114, 116 may not all have the same computing resources available. As discussed further herein, present systems and methods may be used to allow a customer or potential customer to find a provider computing site that has (or can be altered to have) the necessary resources available to provide a desired computing service and is close enough to a customer site to meet a customer's latency requirements.

For example, client device 102 may access a service portal 106 associated with the provider system 104. The service portal 106 may receive a service request (e.g., through a user interface rendered on client device 102) for one or more provider computing sites 110, 112, 114, and/or 116 to provide computing services (e.g., host an application, host content, etc.) on behalf of a customer. Client device 102 may be at the customer site 105 or may be located elsewhere when the service request is submitted to the service portal 106. In some examples, client device 102 and client device 103 are the same device.

The service request comprises customer information that includes, e.g., a location of the customer site(s) 105, and the computing service being requested. The service request may also include a latency threshold or a latency requirement that indicates a maximum amount of time it should take data to reach one or more customer site 105 from the provider computing site(s) 110, 112, 114, and/or 116. Although only one customer site 105 is depicted, multiple customer sites may be specified in the request. The latency threshold may, for example, be 5 ms or less, 10 ms or less, 15 ms or less and so on. Although specific thresholds are given, various latency thresholds may be specified. In some examples, the threshold may be based on the type of operations that will be performed by the provider computing site(s) 110, 112, 114, and/or 116. For example, a service request may include a first latency threshold for a first type of application to be hosted and a second latency threshold for a second type of application to be hosted. In other examples, the threshold may be based on the type of data stored by the provider computing site(s) 110, 112, 114, and/or 116.

The service request may also include the physical address/location (such as a street address) of the customer site(s) 105. Additionally, the service request may indicate the type of services requested or otherwise specify the required capabilities (e.g., number of servers, server size, storage capabilities, security certifications, bandwidth, etc.) that are needed to provide the requested services. For example, the service request may include a request for a particular type of edge computing device to be allocated to the customer at the provider computing site(s) 110, 112, 114, and/or 116 (e.g., a server of a particular size, that performs various actions, processes particular types of data, hosts a particular type of content). The service request may also include a request for a particular number of edge computing devices at the provider computing site(s) 110, 112, 114, and/or 116 to perform the requested task(s). In examples, the service request may comprise a single request message received by the service portal 106, or it may comprise a series of messages that are received, e.g., in response to prompts provided by the service portal 106 to client device 102.

Information from the service request may be extracted by the service portal 106 and forwarded to the recommendation system 108. Recommendation system 108 may use the information to determine which of the provider computing site(s) 110, 112, 114, and/or 116 to recommend for customer site 105. In order to make a recommendation, the recommendation system 108 may perform several functions: (1) determining, based on a rough latency estimate, which of the provider computing site(s) 110, 112, 114, and/or 116 meet the latency requirement(s) specified in the service request; (2) determining which of the provider computing site(s) 110, 112, 114, and/or 116 currently have available resources to provide the service(s) specified in the service request; (3) if required resources to provide the service(s) are not available at one or more of the provider computing site(s) 110, 112, 114, and/or 116, determining whether such resources could be added; and (4) if required resources can be (and would need to be) added, estimating when such resources could be added; and (5) determining costs associated with providing the requested service(s) from one or more of the provider computing site(s) 110, 112, 114, and/or 116.

For example, recommendation system 108 may forward the location/address information for customer site(s) 105 to a location system 120. Location system 120 may convert the location/address information (such as a street address) for the customer site(s) 105 to global positioning system (GPS) coordinates. In some examples, the location system 120 may return the GPS coordinates for customer site(s) 105 to the recommendation system 108, where the GPS coordinates are used by the recommendation system 108 to further process the service request. In other examples, the recommendation system 108 requests that the location system 120 determine (and return) all of the provider computing site(s) 110, 112, 114, and/or 116 that are within a particular service radius from customer site(s) 105. For example, recommendation system 108 and/or location system 120 may also store location information (such as GPS coordinates) of all of the provider computing site(s) 110, 112, 114, and/or 116. The recommendation system 108 and/or location system 120 may then use the GPS coordinates of both the customer site(s) 105 and the provider computing site(s) 110, 112, 114, and/or 116 to determine which of the provider computing site(s) 110, 112, 114, and/or 116 are within the service radius of customer site(s) 105.

In examples, the service radius may be determined (by recommendation system 108 and/or location system 120) based on the latency requirement(s) in the service request. In an example (e.g., where the provider system 104 comprises an optical fiber network), the service radius may be based, at least in part, on the speed of light. For example, the speed of light is 186,000 miles per second, which is equivalent to 186 miles per millisecond. If the specified latency requirement is less than or equal to 5 ms, the allowable service radius between a customer site 105 and a location of the provider computing site(s) 110, 112, 114, and/or 116 is 930 miles. Distance between the provider computing site(s) 110,

112, 114, and/or 116 and the customer site 105 can be used as a rough estimate of latency. In this example, a provider computing site(s) 110, 112, 114, and/or 116 that is located outside of the 930 mile radius may not be considered a potential provider computing site since it could not meet the specified 5 ms latency requirement. In some examples, one or more provider computing site(s) 110, 112, 114, and/or 116 that are outside of this example 930 mile radius may still be considered or otherwise identified as an alternative edge computing device/site. Alternative provider computing site(s) 110, 112, 114, and/or 116 may be selected for use by a customer, e.g., if other options are not available and/or desirable.

In examples, the rough latency estimate (and radius calculation) may be based on a straight line distance between the customer site(s) and the provider computing site(s) 110, 112, 114, and/or 116. The rough latency estimate (and radius calculation) may also be altered or otherwise updated/refined based on known communication line path(s) (e.g., fiber paths) between the customer site(s) 105 and the locations of (or near) the provider computing site(s) 110, 112, 114, and/or 116. For example, if the fiber path is relatively straight between the user/entity and the edge computing device/site, the calculation may be relatively accurate. However, if the fiber path follows various curves in a road, the calculation may need to be adjusted/altered to account for potentially longer distances along the fiber path(s). In examples, recommendation system 108 and/or location system 120 may store and use fiber path maps to determine a more accurate fiber path distance between the customer site(s) 105 and the locations of the provider computing site(s) 110, 112, 114, and/or 116. The rough latency estimate using the refined fiber path distance measurement/estimation may then be used in identifying the provider computing site(s) 110, 112, 114, and/or 116 that are likely to meet the specified latency requirements.

In some examples, one or more of the nearest provider computing site(s) 110, 112, 114, and/or 116 may not have available resources to provide the requested service(s). For example, provider computing site(s) 110, 112, 114, and/or 116 may not have enough available or desired server(s), bandwidth, hardware, space, storage, correct operating system instance(s), security certification(s), or other resources to provide the requested service(s). In examples, the recommendation system 108 may determine resource availability at the provider computing site(s) 110, 112, 114, and/or 116. For example, the recommendation system 108 may determine necessary resources to provide the requested service (e.g., a certain number of servers of a particular size, having a particular number of ports, etc.) and query an inventory system 122 to determine which of the provider computing site(s) 110, 112, 114, and/or 116 have the necessary available resources. In some examples, the recommendation system 108 may first determine the provider computing site(s) 110, 112, 114, and/or 116 that meet the specified latency requirements (at least using the rough estimate(s) of latency) and query the inventory system 122 only for those the provider computing site(s) 110, 112, 114, and/or 116. In other examples, the recommendation system 108 may first determine the provider computing site(s) 110, 112, 114, and/or 116 that have (or can be altered to have) the necessary available resources and then determine from that list the provider computing site(s) 110, 112, 114, and/or 116 that meet the specified latency requirements. Other orders of operation are also possible.

In examples, the inventory system 122 is a computing system that is updated periodically to reflect the resources present, currently used, and currently available at the provider computing site(s) 110, 112, 114, and 116. Recommendation system 108 may then verify resource availability by querying inventory system 122.

In examples, when a provider computing site 110, 112, 114, and/or 116 does not have the necessary available resources, the recommendation system 108 may determine whether the missing resources could be added to that provider computing site 110, 112, 114, and/or 116. In some examples, the recommendation system 108 may make such a determination only if the particular provider computing site 110, 112, 114, or 116 is otherwise of interest. For example, recommendation engine 108 may be configured to, if the closest provider computing site (or one of a predetermined number of the closest sites) does not have the necessary resources available, query a procurement system 124 to determine if the missing, necessary resources can be added. In examples, procurement system 124 may comprise a computing system that is updated with information necessary to determine whether, and to estimate when, the missing, necessary resources can be added to a particular provider computing site(s) 110, 112, 114, and/or 116.

For example, recommendation system 108 may determine from the service request that a customer will need two servers of a particular size to provide the requested computing service. The recommendation system 108 may query the location system 120 and determine that provider site A 110 is the closest provider computing site to customer site 105, and that it is the only one of provider computing site(s) 110, 112, 114, and/or 116 that is within the service radius necessary to meet latency requirements included in the service request. Further, recommendation system 108 may query inventory system 122 and determine that only one server of the requisite size is currently available at provider site A 110. Recommendation engine 108 may then query procurement system 124 to determine whether a server of that size can be added to provider site A 110, and, if so, when that server could be added to provider site A 110. In examples, procurement system 124 may query internal or external systems to determine whether the missing, necessary resource can be added to provider site A 110 (e.g., whether there is available space in a rack for a server of that size, whether any power or other site thresholds would be exceeded, etc.). The procurement system 124 may also determine whether that required server exists in the provider's inventory, would need to be procured from a third party, and when it could be, in either case, delivered and installed.

In examples, recommendation system 108 may also determine costs associated with providing the service from one or more of the provider computing site(s) 110, 112, 114, and/or 116. For example, a customer may be charged different costs for providing the service from different ones of provider computing site(s) 110, 112, 114, and/or 116, including any costs associated with adding missing, necessary resources to such site(s) in order to provide the requested computing service.

In examples, recommendation system 108 can then provide one or more initial recommendations to client device 102 (e.g., through service portal 106) regarding which provider computing site(s) 110, 112, 114, and/or 116 can provide the requested computing service. The recommendation may comprise an ordered list of best-match provider computing site(s) 110, 112, 114, and/or 116. The recommendation may also include additional information about the site(s), including location, quantities of available resources, the rough estimate of latency, costs, etc. The order of the provider computing site(s) 110, 112, 114, and/or 116 on the recommendation list may be based on (and/or sortable on) the rough estimate of latency for each site, costs, the date that all necessary resources are estimated to be available, or any other metric. In examples, only sites where the rough latency estimate meets the latency requirement of the service request and that have the necessary resources (or where the necessary resources can be added within a particular time period) are included in the recommendation. In other examples, a certain number of best-matching provider computing site(s) 110, 112, 114, and/or 116 are included in the recommendation, regardless of whether one or more of the request parameters are not met. For example, if a rough estimate of latency for a provider computing site is only slightly higher than the latency requirement in the service request, that site may still be included in the list (e.g., with the rough estimate of latency noted).

In some examples, a customer may be given the option to obtain a fine estimate of latency by performing an actual latency test on a test server installed at a particular one or more of provider computing site(s) 110, 112, 114, and/or 116. For example, recommendation system 108 may return a list of recommended provider computing site(s) 110, 112, 114, and/or 116 along with the rough estimate of latency for each. Service portal 106 may provide a selectable option to cause a traceroute test to be performed between a client device 103 at customer site 105 and one or more of the provider computing site(s) 110, 112, 114, and/or 116 in the initial recommendation list from recommendation system 108. In other examples, the traceroute test may be initiated without an initial recommendation from recommendation system 108 or a selection from client device 103.

In examples, upon receiving selection of the option to cause a fine estimate of latency to be performed, service portal 106 may redirect client device 102 to a test portal 126. In some examples, test portal 126 and service portal 106 may be combined. Test portal 126 may query the client device 102 to determine whether client device 102 is located at the customer site 105. For example, an operator of client device 102 may be prompted for that information or that information may be determined or inferred based on the IP address of the client device 102 and/or the routing of any messages from client device 102. If client device 102 is not at customer site 105, the test portal 126 may prompt an operator of client device 102 to enter (and send to test portal 126 and/or service portal 106) an IP address of a client device that is at customer site 105 (such as client device 103). Test portal 126 and/or service portal 106 may then cause a software agent to be sent to and installed upon client device 103.

Such software agent may be configured to run a latency test between client device 103 and the one or more provider computing site(s) 110, 112, 114, and/or 116 that are of interest. For example, if provider site C 114 is a provider computing site of interest (e.g., is in the initial recommendation list), then the software agent on client device 103 may be configured to send a traceroute request to test server C operating at provider site C 114, e.g., via a network such as network 130. Network 130 may be any type of public network (e.g., Internet), private network, hybrid network, etc. The test servers (such as test server C) may be instantiated when needed or may be continually operating at each provider computing site(s) 110, 112, 114, and/or 116. Test server C operating at provider site C 114 may then respond to the latency test, and the software client on client device 103 may report the results to test portal 126 and/or service portal 106. In other examples, the test portal 126, service portal 106, and/or recommendation system 108 may cause the latency test to be initiated from the test server C operating at provider site C 114 to the software agent operating on client device 103 and report the results to the test portal 126 and/or service portal 106. This procedure can be repeated for multiple of provider computing site(s) 110, 112, 114, and/or 116 that are of interest. In this manner, more accurate latency estimations can be made before a customer determines which provider computing site(s) 110, 112, 114, and/or 116 should be selected. In examples, the list of recommended provider computing site(s) 110, 112, 114, and/or 116 may be reordered based on the fine latency estimate and presented again, e.g., in service portal 106.

In examples, a selection of particular provider computing site(s) 110, 112, 114, and/or 116 on which a customer desires to initiate the requested computing service may then be received (e.g., at service portal 106). For example, a customer may enter a final selection and order the requested service through service portal 106. Procurement system 124 may then be used to automatically procure any missing, necessary resources that were identified for the selected site(s). For example, this may include automatically ordering new equipment, causing installation of new servers and/or communications lines, etc.

The requested computing service can then be instantiated and provided from the selected provider computing site(s) 110, 112, 114, and/or 116 to customer site 105. For example, if the requested computing service comprises the use of two servers at provider computing site 110, then the servers may be assigned to the customer, installed, allocated IP address(es), configured with any necessary software/operating system, etc., and made available to the customer site(s) 105.

Figure 2:
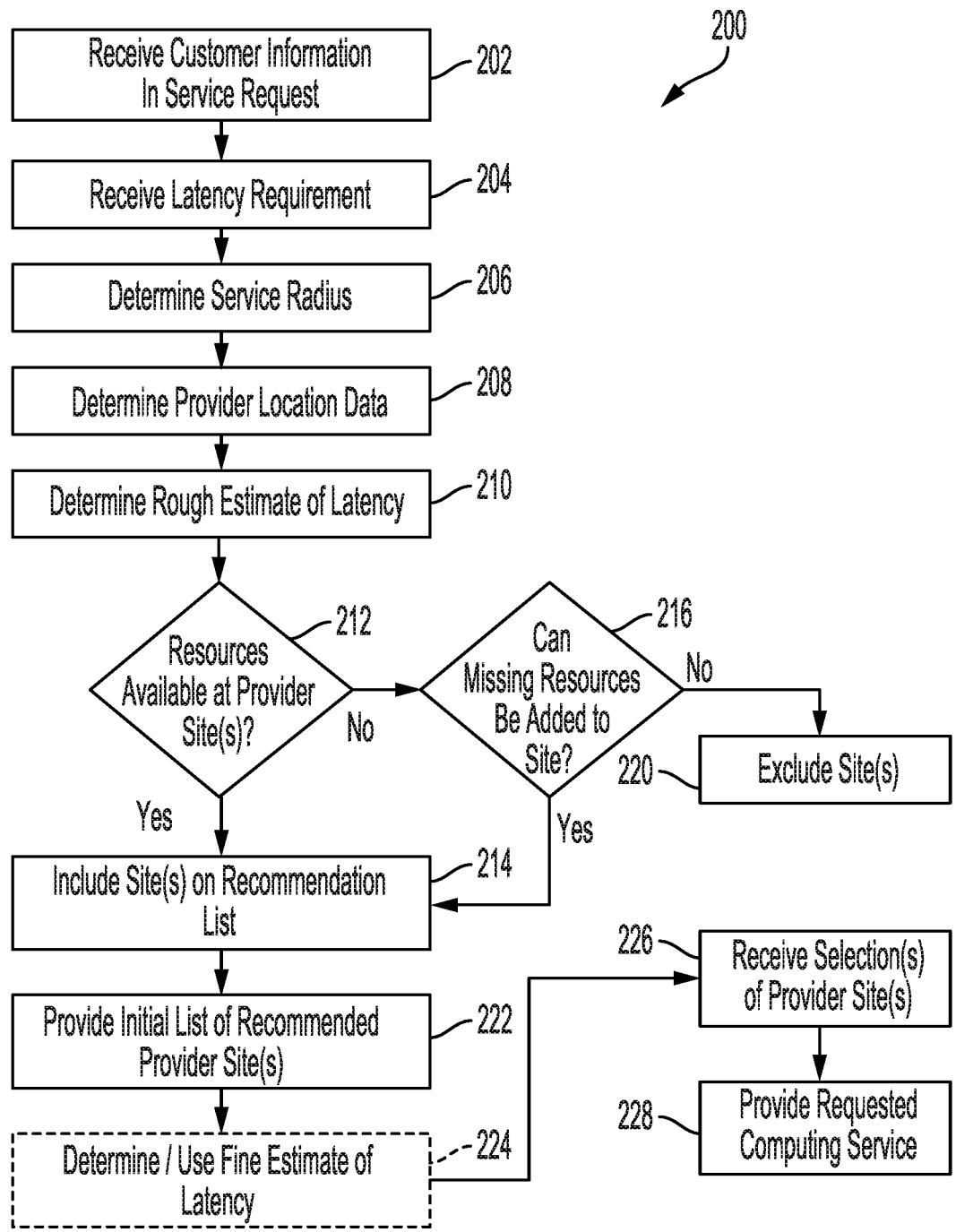
FIG. 2 depicts a method for recommending an implementing edge computing according to presently described examples.

FIG. 2 illustrates an example method 200 for recommending and implementing edge computing for a customer. In examples, some or all of the operations of method 200 may be implemented by a recommendation system, such as recommendation system 108 in FIG. 1; however, certain operations may be performed by one or more other elements of system 100 depicted in FIG. 1.

At operation 202, customer information is received in a service request. For example, recommendation system 108 and/or service portal 106 may receive a service request. The request may include customer information comprising, e.g., a desired computing service and customer location data for a customer site to which the requested computing service is to be provided. For example, the customer information may include a request for the use of two servers of a particular size and an address of a customer site (such as customer site 105) at 123 Maple Avenue, Nowhere, CO 99999.

At operation 204, a latency requirement is received. For example, the customer information included in the service request may specify a maximum latency that a customer desires for the requested computing service. In examples, operation 202 and 204 can be combined. In other examples, the latency requirement may be received separately. In some examples, the latency requirement may be obtained from other systems. For example, the recommendation system 108 may query existing computing systems within the provider system 104 to determine the average latency that the customer is currently experiencing and use that as a latency requirement.

At operation 206, a service radius is determined based on the latency requirement. For example, recommendation system 108 may determine a maximum distance that a provider computing site (e.g., provider computing site(s) 110, 112, 114, 116) may be from the customer site 105 in order to deliver the requested computing service and meet the latency requirement. In examples, the service radius may be based on the speed of light multiplied by the latency requirement (in the form of a maximum latency limit). In other examples, the service radius may be determined differently based on the nature of the network.

At operation 208, provider location data for a plurality of provider computing sites is determined. For example, recommendation system 108 may determine (or cooperate with location system 120 to determine) locations of provider computing site(s) 110, 112, 114, 116. In examples, the provider location data may be in the form of GPS coordinates for provider computing site(s) 110, 112, 114, 116.

At operation 210, a rough estimate of latency for each of the plurality of provider computing sites is determined based on the customer location data and the provider location data. For example, recommendation system may determine (or cooperate with location system 120 to determine) a distance between the customer site 105 and each of the plurality of provider computing site(s) 110, 112, 114, 116. As discussed, this may include converting the customer location data to GPS coordinates and determining a straight-line distance between the provider computing site(s) 110, 112, 114, 116 and the customer site 105. In other examples, a map that fiber or other network transport actually follows between the customer site 105 and each of the provider computing site(s) 110, 112, 114, 116 may be used to determine the distance. Determining the rough estimate of latency, in some examples, may include converting the distance to a latency estimate expressed in terms of time (e.g., based on the speed of light). In other examples, determining the rough estimate of latency may comprise determining that the distance is less than the service radius (thus suggesting that the provider computing site(s) 110, 112, 114, 116 in question will be able to meet the latency requirement).

At operation 212, it is determined whether at least a first provider computing site includes available resources necessary to provide the computing service. For example, recommendation system 108 may determine (or cooperate with inventory system 122 to determine) whether one or more of the provider computing site(s) 110, 112, 114, 116 currently has resources available to provide the computing service that was requested by the customer. In examples, operation 212 may be performed for all provider computing site(s) 110, 112, 114, 116 that meet the latency requirement (e.g., that are within the service radius). In other examples, resource availability for more or fewer provider computing site(s) 110, 112, 114, 116 may be determined.

When the first provider computing site does include available resources necessary to provide the computing service, flow branches to operation 214, where the first provider computing site is included on a list of recommended provider computing site(s). For example, if provider computing site A 110 is determined to be within the service radius and has the available resources necessary to provide the computing service, then it may be included on the recommended provider computing site list generated by recommendation system 108.

When the first provider computing site does not include available resources necessary to provide the computing service, flow branches to operation 216, where it is determined whether additional resources can be added to the first provider computing site to provide the computing service. For example, if provider computing site A 110 is determined to be within the service radius, but does not have the available resources necessary to provide the computing service, recommendation system 108 may determine (or cooperate with procurement system 124 to determine) whether the missing, necessary resources may be added to provider computing site A 110 to provide the requested computing service. In examples, such determination may also include determining when such additional resources could be added.

When the additional resources can be added to the first provider computing site to provide the computing service, flow branches to operation 214, where the first provider computing site may be included on the list of recommended computing site(s), along with an indication of when the additional resources can be added. When the additional resources cannot be added to the first provider computing site, flow branches to operation 220, where the first provider computing site may be excluded from the list of recommended provider computing site(s).

Flow proceeds to operation 222, where a list of provider computing site(s) is provided. For example, the recommendation system 108 may provide a list of recommended provider computing site(s) 110, 112, 114, 116 to service portal 106 and/or client device 102 based on, e.g., the rough estimate of latency for the provider computing site(s) 110, 112, 114, 116, resource availability (current or potential), or other metrics. In some examples, the list of recommended provider computing site(s) is limited only to site(s) that are within the service radius and have (or could be modified to have) the necessary resources to provide the requested computing service.

Flow proceeds to optional operation 224, where a fine estimate of latency may be determined and used to refine the list of provider computing site(s). An example of operation 224 is described with relation to FIG. 3.

Flow proceeds to operation 226, where a selection of at least one of the list of provider computing site(s) is received. For example, client device 102 may receive a user selection of one of the recommended provider computing site(s) 110, 112, 114, 116 through a user interface and communicate the selection to the service portal 106 and/or recommendation system 108.

Flow proceeds to operation 228, where the requested computing service is provided to the customer site from the selected provider computing site(s). For example, procurement system 124 may then be used to automatically (e.g., in response to receiving the selection of the provider computing site(s)) procure any missing, necessary resources that were identified for the selected provider computing site(s). The requested computing service can then be instantiated and provided from the selected provider computing site(s) 110, 112, 114, and/or 116 to customer site 105. For example, if the requested computing service is the use of two servers at provider computing site A 110, then the servers may be automatically assigned to the customer, installed, allocated IP address(es), configured with any necessary software/ operating system, etc., and made available to the customer site.

Figure 3:
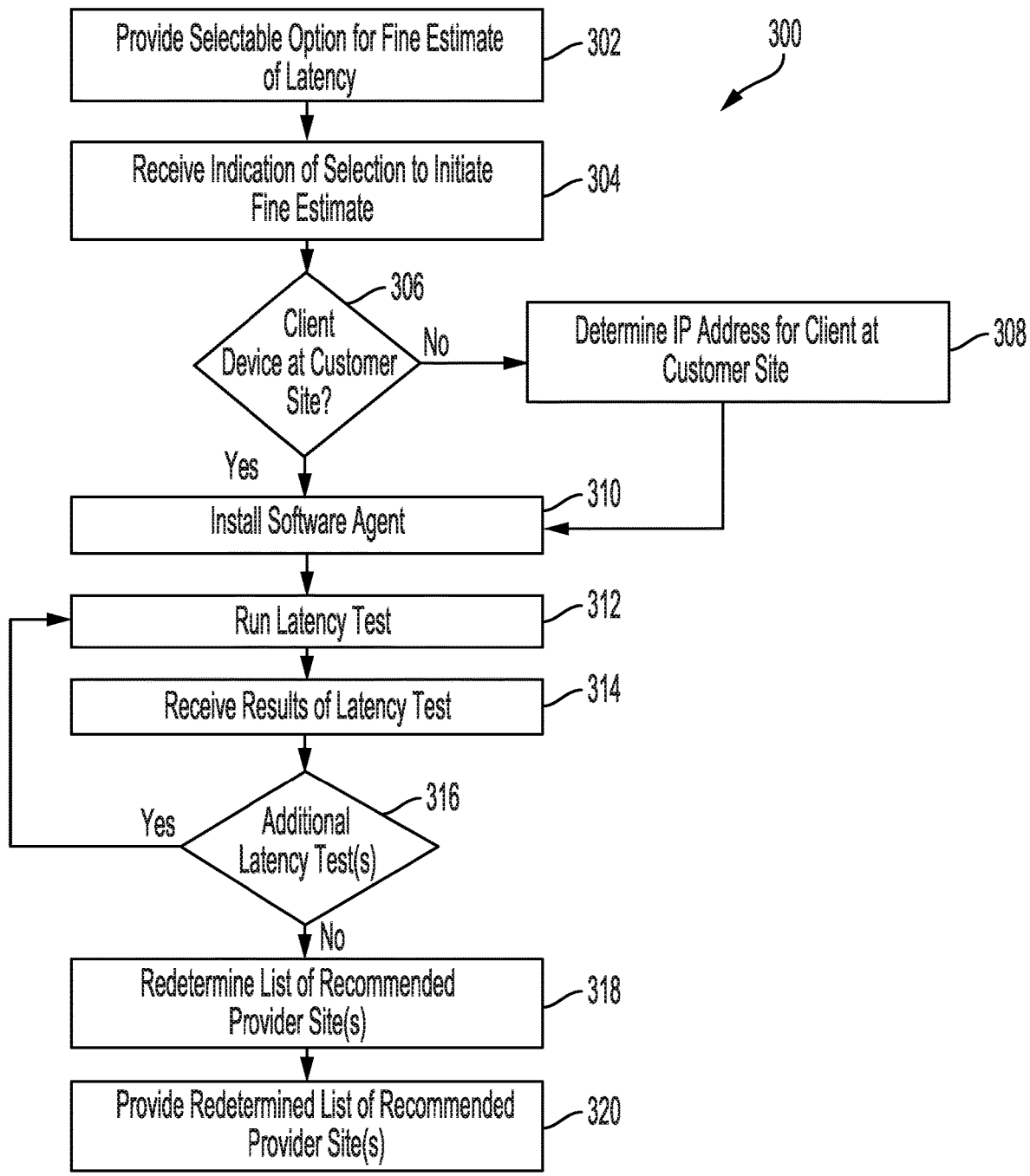
FIG. 3 depicts another method for recommending an implementing edge computing according to presently described examples.

FIG. 3 depicts an example method 300 for determining and using a fine estimate of latency to refine the list of provider computing site(s). In examples, method 300 may comprise optional operation 224 in FIG. 2. At operation 302, a selectable option may be provided to initiate a fine estimate of latency. For example, recommendation system 108 may return an initial list of recommended provider computing site(s) 110, 112, 114, and/or 116 along with the rough estimate of latency for each. Service portal 106 may provide a selectable option to cause client 102 to cause a latency test to be performed between a client device 103 at customer site 105 and one or more of the provider computing site(s) 110, 112, 114, and/or 116 in the initial recommendation list.

Flow proceeds to operation 304, where an indication of selection of the selectable option to initiate a fine estimate of latency is received. For example, service portal 106 and/or recommendation system 108 may receive an indication of the selection from client device 102. The indication of selection may, in examples, be for particular ones of the provider computing site(s), for all of the provider computing site(s) appearing on the initial recommendation list, for a specified number of top-recommended provider computing site(s) on the initial recommendation list, or otherwise.

Flow proceeds to operation 306, where it is determined whether the client device that provided the indication is at the customer site. For example, test portal 126 and/or service portal 106 may query the client device 102 to determine whether client device 102 is located at the customer site 105. In examples, an operator of client device 102 may be prompted for that information or it may be automatically determined or inferred.

If the client device is not at the customer site, then flow proceeds to operation 308, where an address for a client device at the customer site is determined. For example, if client device 102 is not at customer site 105, the test portal 126 and/or service portal 106 may prompt an operator of client device 102 to enter (and send to test portal 126 and/or service portal 106) an IP address of a client device that is at customer site 105 (such as client device 103).

Flow proceeds to operation 310, where a software agent is caused to be installed at a client device at the customer site. For example, test portal 126 and/or service portal 106 may cause a software agent to be sent to and installed upon client device 103. In examples, operation 310 may include sending a software agent to the client device 103 and prompting a user to install the software agent.

Flow proceeds to operation 312, where a latency test is caused to be run between the client device and provider computing site(s) that are of interest. In examples, the software agent may be configured to initiate a latency test between client device 103 and the one or more provider computing site(s) 110, 112, 114, and/or 116 that appeared in the initial recommendation list based on the rough latency estimates. For example, if provider site C 114 is the provider computing site of interest, then the software agent on client device 103 may be configured to send a traceroute request to test server C operating at provider site C 114, e.g., via a network such as network 130. Test server C operating at provider site C 114 responds to the latency test. In other examples, the test portal 126, service portal 106, and/or recommendation system 108 may cause the latency test to be initiated from the test server C operating at provider site C 114 to the software agent operating on client device 103.

At operation 314, the results of the latency test are received. For example, the software client on client device 103 and/or the test server operating on the one or more provider computing site(s) 110, 112, 114, and/or 116 may report the results to test portal 126, recommendation system 108, and/or service portal 106.

At operation 316, it is determined whether the latency test should be run on additional provider computing site(s). For example, system 100 may automatically repeat operations 312 and 314 for all provider computing site(s) appearing on the initial recommendation list from recommendation system 108 that was based on the rough estimate of latency. In other examples, operations 312 and 314 are repeated for only a certain number of the top-recommended provider computing site(s) on the initial recommendation list. In other examples, operations 312 and 314 are repeated for all provider computing site(s) that were indicated as selected at operation 304.

When no further latency tests are to be run on additional provider computing site(s), flow proceeds to operation 318, where the list of recommended provider computing site(s) is redetermined based on the fine estimate(s) of latency. For example, recommendation system 108 may replace the rough estimate of latency with a fine estimate of latency for each provider computing site for which operations 312 and 314 were performed. Recommendation system 108 can then use the fine estimate of latency in generating a revised list of recommended provider computing site(s). As discussed, the order of the provider computing site(s) on the recommendation list may be based on (and/or sortable on) the estimate of latency for each site, costs, the date that all necessary resources are estimated to be available, or any other metric. In some examples, the list of recommended provider computing site(s) 110, 112, 114, and/or 116 may be reordered based on the fine latency estimate. In other examples, the fine estimate of latency will not change the order of the recommended list of provider computing site(s).

Flow proceeds to operation 320, where the redetermined (and possibly revised) list of recommended provider computing site(s) is provided. For example, the recommendation system 108 may cause the redetermined list of recommended provider computing site(s) to be presented again in or through service portal 106 to client device 102.

Figure 4:
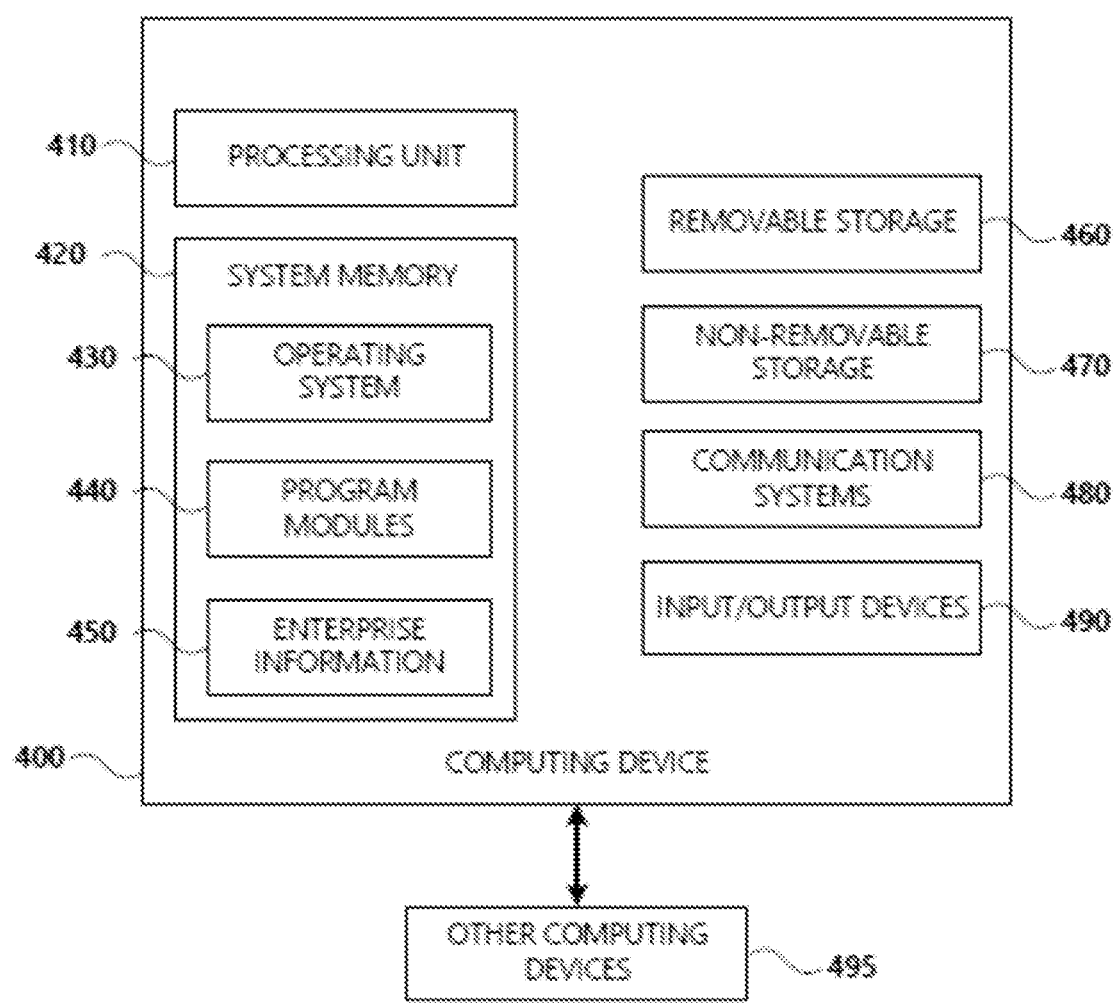
FIG. 4 depicts an example computing environment with which one or more of the presently described systems and methods may be implemented or practiced.

FIG. 4 is a system diagram of a computing device 400 according to an example. The computing device 400, or various components and systems of the computing device 400, may comprise, or be integrated or associated with, elements of system 100, including at least client device 102, client device 103, customer site 105, service portal 106, recommendation system 108, provider computing sites 110, 112, 114, 116, location system 120, inventory system 122, procurement system 124, and/or test portal 126. As shown in FIG. 4, the physical components (e.g., hardware) of the computing device 400 are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining enterprise information 450 such as domain information, telephone numbers, attestation level requests and so on. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media is non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Although the devices, systems, apparatus and methods have been described and illustrated in connection with certain embodiments, variations and modifications will be evident to those skilled in the art. Such variations and modifications may be made without departing from the scope and spirit of the present disclosure, and are therefore anticipated. The description and teachings herein are thus not to be limited to the precise details of methodology or construction set forth herein because variations and modification are intended to be included within the scope of the present disclosures and teachings.

What is claimed is:

1. A method, comprising:
   receiving customer information in a service request, wherein the customer information includes at least a desired computing service and customer location data for a customer site;
   determining provider location data for a plurality of provider computing sites;
   determining a rough estimate of latency for each of the plurality of provider computing sites based on the customer location data and the provider location data;
   providing an ordered list of the provider computing sites based on the rough estimate of latency for each of the provider computing sites;
   determining a first fine estimate of latency for a first provider computing site;
   determining a second fine estimate of latency for a second provider computing site of the plurality of computing sites;
   determining a redetermined ordered list of the plurality of provider computing sites based at least on the first fine estimate and the second fine estimate;
   providing the redetermined ordered list of the plurality of provider computing;
   receiving, from a client device associated with the customer site, a selection of one of the provider computing sites;
   providing the computing service to the customer site from the selected provider computing site.

2. The method of claim 1, further comprising:
   receiving a latency requirement; and
   determining, based on the latency requirement, a service radius;
   wherein providing the list of the providing computing sites comprises including on the list only provider computing sites that are located within the service radius of the customer site.

3. The method of claim 1, further comprising:
   determining whether a first provider computing site of the plurality of computing sites includes available resources necessary to provide the computing service;
   when the first provider computing site does include available resources necessary to provide the computing service, including the first provider computing site on the list;
   when the first provider computing site does not include available resources necessary to provide the computing service:
   determining whether additional resources can be added to the first provider computing site to provide the computing service;
   when the additional resources can be added to the first provider computing site to provide the computing service, including the first provider computing site on the list along with an indication of when the additional resources can be added;

when the additional resources cannot be added to the first provider computing site, excluding the first provider computing site from the list.

4. The method of claim 3, wherein the selected provider computing site is the first provider computing site and the first provider computing site does not include available resources necessary to provide the computing service, further comprising:
automatically causing the additional resources to be added to the first provider computing site.

5. The method of claim 1, further comprising:
providing a client agent to the client device;
causing the client agent to perform a first latency test between the client device and the first provider computing site to determine the first fine estimate; and
causing the client agent to perform a second latency test between the client device and the second provider computing site to determine the second fine estimate.

6. The method of claim 5, further comprising:
causing a first latency test server to be instantiated at the first provider computing site;
causing a second latency test server to be instantiated at the second provider computing site;
wherein the first latency test is performed between the client device and the first latency test server and the second latency test is performed between the client device and the second latency test server.

7. The method of claim 5, wherein at least the first latency test is a traceroute between the client device and the first provider computing site.

8. The method of claim 1, wherein the customer location data comprises a street address of the customer site, further comprising:
translating the street address to a global positioning satellite (GPS) location; and
determining a distance between the GPS location and each of the provider computing sites;
wherein determining the rough estimate of latency is based on the distance and a speed of light.

9. The method of claim 1, further comprising:
providing a client agent to the client device;
determining whether the client device is at the customer site;
when the client device is not at the customer site, sending a query to the client device to determine an internet protocol (IP) address of a second client device at the customer site;
receiving the IP address of the second client device;
performing a first latency test between the second client device and the first provider computing site to determine the first fine estimate;
performing a second latency test between the second client device and the second provider computing site to determine the second fine estimate; and
providing a redetermined list of the plurality of provider computing sites based at least on the first fine estimate and the second fine estimate.

10. A system, comprising:
at least one processor;
memory, operatively connected to the at least one processor and storing instructions that, when executed by the at least one processor, cause the system to perform a method, the method comprising:
receiving customer information in a service request, wherein the customer information includes at least a desired computing service and customer location data for a customer site;
determining provider location data for a plurality of provider computing sites;
determining a rough estimate of latency for each of the plurality of provider computing sites based on the customer location data and the provider location data;
providing an ordered list of the provider computing sites based on the rough estimate of latency for each of the provider computing sites;
determining a first fine estimate of latency for a first provider computing site;
determining a second fine estimate of latency for a second provider computing site of the plurality of computing sites;
determining a redetermined ordered list of the plurality of provider computing sites based at least on the first fine estimate and the second fine estimate;
providing the redetermined ordered list of the plurality of provider computing sites;
receiving, from a client device associated with the customer site, a selection of one of the provider computing sites; and
providing the computing service to the customer site from the selected provider computing site.

11. The system of claim 10, wherein the method further comprises:
receiving a latency requirement; and
determining, based on the latency requirement, a service radius;
wherein providing the list of the providing computing sites comprises including on the list only provider computing sites that are located within the service radius of the customer site.

12. The system of claim 10, wherein the method further comprises:
determining whether a first provider computing site of the plurality of computing sites includes available resources necessary to provide the computing service;
when the first provider computing site does include available resources necessary to provide the computing service, including the first provider computing site on the list;
when the first provider computing site does not include available resources necessary to provide the computing service:
determining whether additional resources can be added to the first provider computing site to provide the computing service;
when the additional resources can be added to the first provider computing site to provide the computing service, including the first provider computing site on the list along with an indication of when the additional resources can be added;
when the additional resources cannot be added to the first provider computing site, excluding the first provider computing site from the list.

13. The system of claim 12, wherein the selected provider computing site is the first provider computing site and the first provider computing site does not include available resources necessary to provide the computing service, and wherein the method further comprises:
automatically causing the additional resources to be added to the first provider computing site.

14. The system of claim 10, wherein the method further comprises:
providing a client agent to the client device;
causing the client agent to perform a first latency test between the client device and the first provider computing site to determine the first fine estimate; and
causing the client agent to perform a second latency test between the client device and the second provider computing site to determine the second fine estimate.

15. The system of claim 14, wherein the method further comprises:
causing a first latency test server to be instantiated at the first provider computing site;
causing a second latency test server to be instantiated at the second provider computing site;
wherein the first latency test is performed between the client device and the first latency test server and the second latency test is performed between the client device and the second latency test server.

16. The system of claim 10, wherein the customer location data comprises a street address of the customer site, and wherein the method further comprises:
translating the street address to a global positioning satellite (GPS) location; and
determining a distance between the GPS location and each of the provider computing sites;
wherein determining the rough estimate of latency is based on the distance and a speed of light.

17. The system of claim 10, wherein the method further comprises:
providing a client agent to the client device;
determining whether the client device is at the customer site;
when the client device is not at the customer site, sending a query to the client device to determine an internet protocol (IP) address of a second client device at the customer site;
receiving the IP address of the second client device;
performing a first latency test between the second client device and the first provider computing site to determine the first fine estimate;
performing a second latency test between the second client device and the second provider computing site to determine the second fine estimate; and
providing a redetermined list of the plurality of provider computing sites based at least on the first fine estimate and the second fine estimate.

18. A method, comprising:
receiving customer information in a service request, wherein the customer information includes at least a latency requirement, a desired computing service, and customer location data for a customer site;
determining, based on the latency requirement, a service radius;
determining provider location data for a plurality of provider computing sites;
determining whether each of the plurality of provider computing sites is within the service radius of the customer site based on the customer location data and the provider location data;
providing an ordered list of the provider computing sites that are within the service radius of the customer site;
determining a first fine estimate of latency for a first provider computing site;
determining a second fine estimate of latency for a second provider computing site of the plurality of computing sites;
determining a redetermined ordered list of the plurality of provider computing sites based at least on the first fine estimate and the second fine estimate;
providing the redetermined ordered list of the plurality of provider computing sites;
receiving, from a client device associated with the customer site, a selection of one of the provider computing sites from the list; and
providing the computing service to the customer site from the selected provider computing site.

* * * * *